United States Patent
Kusumoto et al.

[11] Patent Number: 5,221,974
[45] Date of Patent: Jun. 22, 1993

[54] IMAGE READER USING TWO FRAMES EACH DRIVEN BY A DIFFERENT MOTOR FOR ADJUSTMENT OF FOCUS

[75] Inventors: Hiroshi Kusumoto, Wakayama; Naruyuki Miyamoto, Sakai; Yoshifumi Ishii, Daito; Shoichi Kitagawa, Neyagawa; Hideki Ishida, Yao, all of Japan

[73] Assignee: Mita Industrial Co., Ltd., Osaka, Japan

[21] Appl. No.: 584,074

[22] Filed: Sep. 18, 1990

[30] Foreign Application Priority Data

Sep. 29, 1989 [JP] Japan .................. 1-256466
Sep. 29, 1989 [JP] Japan .................. 1-256467
Sep. 29, 1989 [JP] Japan .................. 1-256468

[51] Int. Cl.⁵ ................................................ H04N 1/40
[52] U.S. Cl. ................................ 358/471; 358/474; 358/406; 355/235
[58] Field of Search ............... 358/474, 475, 486, 497, 358/494, 401, 419, 420, 421, 422, 471, 406; 355/233, 235

[56] References Cited

U.S. PATENT DOCUMENTS

| | | | |
|---|---|---|---|
| 4,344,696 | 8/1982 | Murata et al. | 355/8 |
| 4,600,293 | 7/1986 | Watanabe | 355/235 |
| 4,620,234 | 10/1986 | Watanabe | 358/497 |
| 4,751,376 | 6/1988 | Sugiura et al. | 358/406 |
| 4,875,104 | 10/1989 | Kamon | 358/474 |
| 5,144,122 | 9/1992 | Danley et al. | 250/234 |

*Primary Examiner*—Edward L. Coles, Sr.
*Assistant Examiner*—Jerome Grant, II
*Attorney, Agent, or Firm*—Sandler Greenblum & Bernstein

[57] ABSTRACT

An image reading device including a contact glass on which an original sheet is set, an exposure lamp for irradiating a face of the original sheet on the contact glass to scan it, a photosensitive element provided below the contact glass, a first mirror for reflecting the light reflected by the original sheet in parallel with an original scanning direction, a second mirror for reflecting the light from the first mirror, a third mirror for reflecting the light from the second mirror, a lens for imaging the light from the third mirror on the photosensitive element, a first moving frame mounting the exposure lamp and first mirror and movable in the original scanning direction, a second moving frame mounting the second and third mirrors and movable following the first moving frame, first and second motors for shifting the first and second moving frames, respectively, and a controller for controlling a driving velocity of the second motor to keep the optical length from the face of the original sheet to be exposed to the light to the lens unchanged.

17 Claims, 13 Drawing Sheets

IMAGE READER USING TWO FRAMES EACH DRIVEN BY A DIFFERENT MOTOR FOR ADJUSTMENT OF FOCUS

BACKGROUND OF THE INVENTION

1. Field of the Invention

The present invention relates to an image reading device applied mainly to an analog copying machine, a digital copying machine and the like.

2. Description of the Prior Art

Conventionally, a reading device of this type includes a contact glass on which an original sheet is set. An exposure lamp irradiates and scans a face of the original sheet and a photosensitive element is provided below the contact glass. A first mirror reflects the light emitted by the exposure lamp and reflected off of the original sheet in a direction parallel with an original scanning direction, a second mirror reflects the light from the first mirror, and a third mirror reflects the light from the second mirror in a direction opposite to that caused by the second mirror. A lens refracts the light from the third mirror and images the light on the photosensitive element. A first moving frame is provided for mounting the lamp and the first mirror, and is movable in the original scanning direction. A second moving frame is provided for mounting the second and third mirrors, and is movable following the first moving frame. A single motor pulls the first and second moving frames through wire, so that the light reflected from the original sheet is directed to the photosensitive sheet to make an image on the same, and the optical length from the contact glass to the lens remains unchanged as the image is read. See, for example, U.S. Pat. No. 4,344,696).

However, in the conventional image reading device, the first and second moving frames are actuated by a single motor through a pulling wire, and hence when the image of the original sheet has to be moved into focus on the photosensitive element, a separate unit by which the first or second moving frame is fixed to the pulling wire must be mechanically displaced to change a distance between the first and second moving frames. Such a required operation is laborious, and additionally, the focusing operation needs the skill and much time.

SUMMARY OF THE INVENTION

The present invention provides an image reading device. An original sheet is set on a contact glass and an exposure lamp irradiates and scans a face of the original sheet. A photosensitive element is provided below the contact glass. A first mirror reflects the light of the exposure lamp reflected by the original sheet in a direction parallel with an original scanning direction, a second mirror reflects the light from the first mirror, a third mirror reflects the light from the second mirror in a direction opposite to that of the light reflected from the second mirror. A lens is provided for imaging the light from the third mirror onto the photosensitive element. A first moving frame is provided for mounting the exposure lamp and first mirror, and is movable in the original scanning direction. A second moving frame is provided for mounting the second and third mirrors, and is movable in a path following the first moving frame. First and second motors are provided for shifting the first and second moving frames, respectively, and control means are provided for actuating the first motor to scan the original sheet and for controlling the driving velocity of the second motor to keep the optical length, from the face of the original sheet, which is exposed to the light, to the lens, unchanged.

Preferably, the first and second motors are stepping motors, and the reading device further comprises first and second drive means for applying drive pulses to the first and second motors, respectively. In accordance with a particular aspect of the invention, operating means are provided for counting the drive pulses applied to the first and second motors, so as to compute a position of each of the first and second moving frames. Setting means are provided for actuating the first or second stepping motor so as to set an optical length, from the contact glass to the lens, to a desired length, and storing means are provided for storing the preset optical length. Preferably, the control means controls the first and second drive means to move the first and second moving frames and maintain the set optical length.

The image reading device may further comprise measuring means for measuring a distance from the exposed face of the original sheet to the contact glass. The control means may actuate the first motor to scan the original sheet, and control a driving velocity of the second motor in accordance with the measured distance, so as to keep the optical length, from the exposed face of the original to the lens, unchanged. Furthermore, the control means desirably starts the first motor earlier than the second motor before the scanning, the controls the first and second motors to keep the optical length from the contact glass to the lens at a predetermined distance during the scanning.

DESCRIPTION OF THE PREFERRED EMBODIMENTS

Now the present invention will be described in detail in conjunction with three embodiments shown in the accompanying drawing, but it is not intended that the present invention be limited to the description and illustration.

Figure 1:
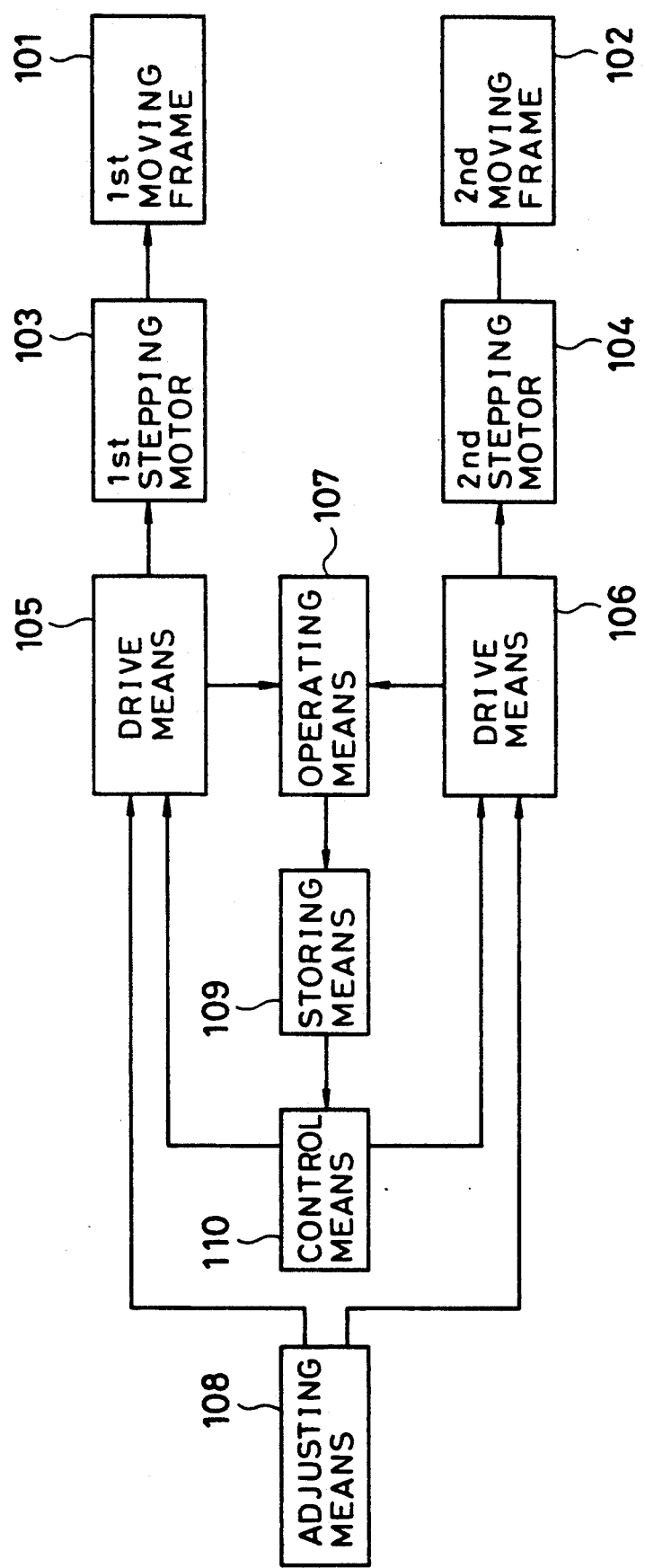
FIG. 1 is a block diagram showing a basic structure of an embodiment according to the present invention.

FIG. 1 is a block diagram showing a basic architecture of an embodiment according to the present invention, including first and second moving frames 101 and 102, first and second stepping motors 103 and 104, first drive means 105 for applying a drive pulse to the first stepping motor 103, and second drive means 106 for applying a drive pulse to the second stepping motor 104. Operating means 107 are provided for counting the drive pulses applied to the first and second stepping motors 103 and 104, respectively, so as to compute a position of each of the first and second moving frames 101 and 102. Adjusting means 108 are provided for actuating the first stepping motor 103 or the second stepping motor 104 so as to adjust an optical length from a contact glass to a lens to a desired length. Storing means 109 store the adjusted optical length, and control means 110 control the first and second drive means 105 and 106, to keep the adjusted optical length, so as to shift the first and second moving frames 101 and 102.

In FIG. 1, the first stepping motor 103 or the second stepping motor 104 is actuated by the adjusting means 108 to shift the first moving frame 101 or the second moving frame 102. In this way, the adjusting means adjusts the optical length from the contact glass to the lens and focuses the lens to place the image of the original sheet on the photosensitive element. The operating means 107 counts the number of drive pulses applied to the stepping motors 103, 104 to compute a position of each of the first and second moving frames 101, 102. In focusing, an appropriate optical length is attained based upon the positional relations between them and stored in the storing means 109. After that, the control means 110 keeps the adjusted optical length (in focus), and controls the first and second moving frames 101, 102 to expose the original sheet to the light and scan the same. In this way, focusing can be easily performed.

Figure 2:
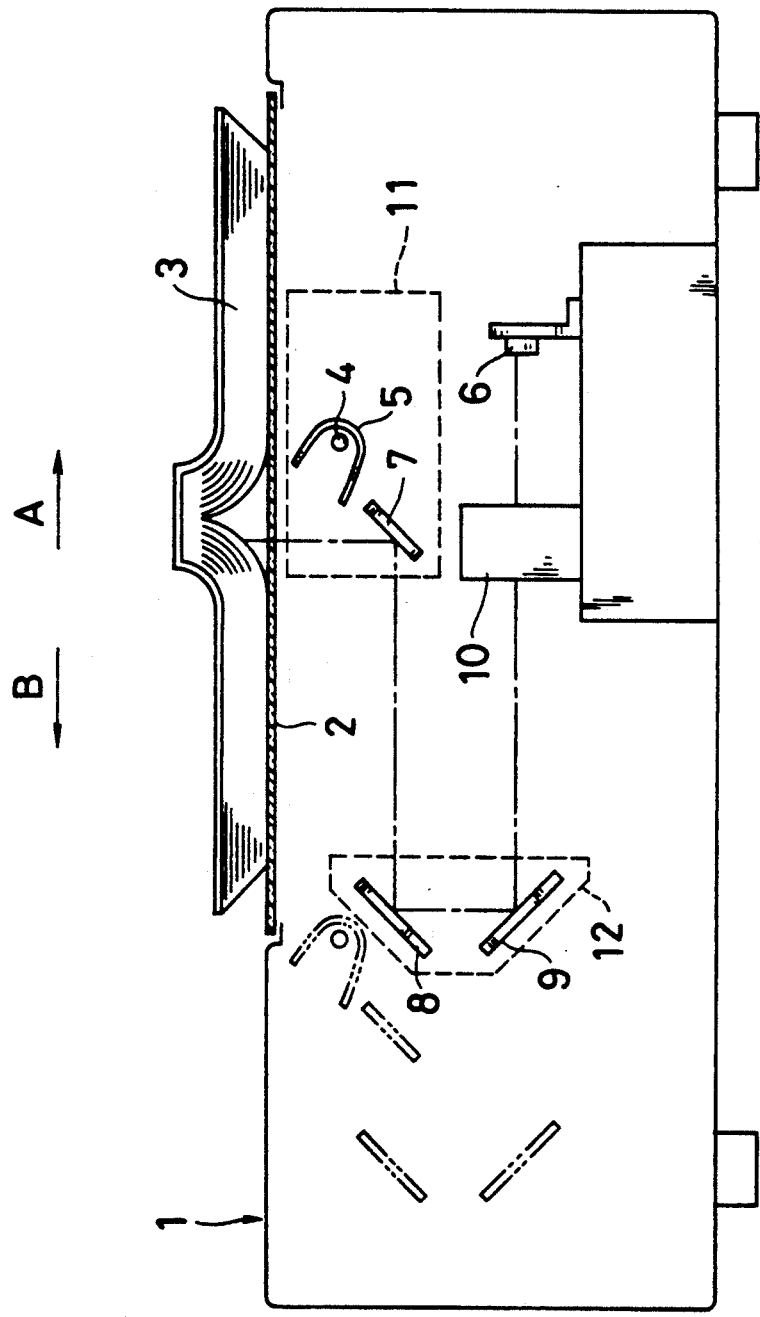
FIG. 2 is a schematic view showing an image reading device of the embodiment according to the present invention.
Figure 3:
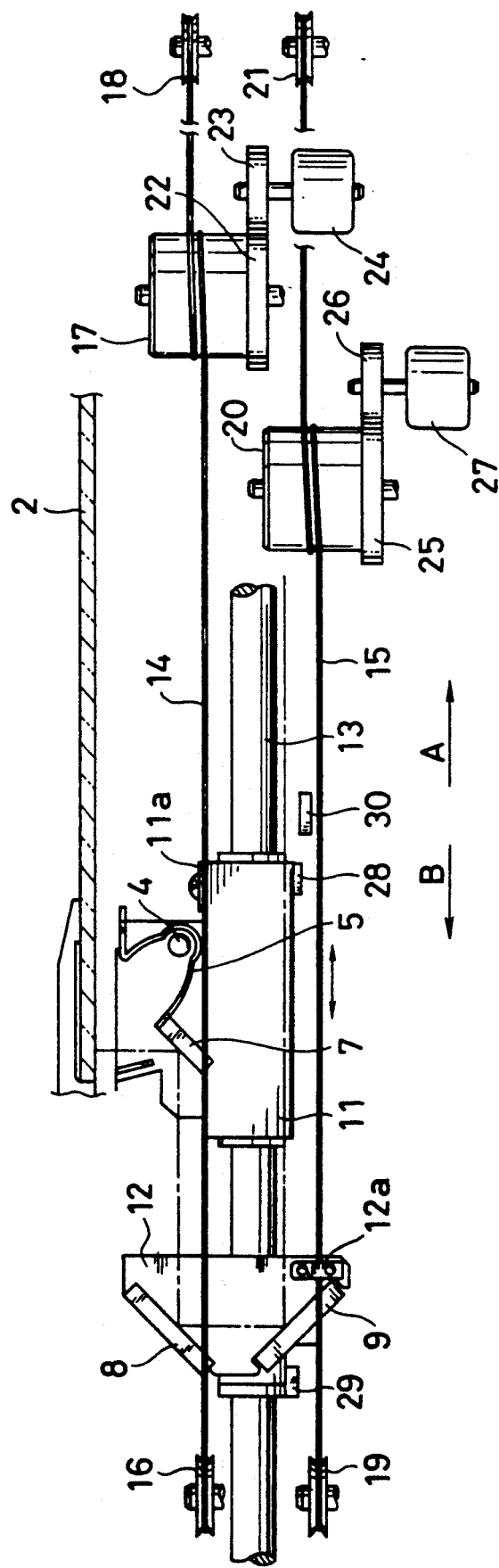
FIG. 3 is a diagram for explaining a structure of a major portion of FIG. 2.

FIG. 2 is a schematic view showing the image reading device of this embodiment employed in a digital copying machine, and FIG. 3 is a diagram illustrating its main part in detail. Referring to these figures, the image reading device comprises a device body 1, a contact glass 2 on which an original sheet 3 is set, and an exposure lamp 4 for scanning the original sheet 3. In addition, a reflecting plate 5 is provided, a CCD memory 6 is placed below the contact glass 2 for reading an image of the original sheet 3, and a first mirror 7 is provided for reflecting the light emitted by the exposure lamp 4 and reflected by the original sheet 3 in parallel with an original scanning direction. A second mirror 8 reflects the light from the first mirror 7, a third mirror 9 reflects the light from the second mirror 8 toward a direction opposite to that of the light reflected from the first mirror 7 to the second mirror 8, and a lens 10 refracts the light from the third mirror 9 for imaging on the CCD memory 6. The exposure lamp 4, the reflecting plate 5 and the first mirror 7 are mounted on a first moving frame 11, and the second and third mirrors 8, 9 are mounted on a second moving frame 12.

As shown in FIG. 3, both the first and second moving frames 11, 12 are slidably held by a sliding shaft 13, and pulled and shifted by wires 14 and 15, respectively. A fixture 11a fixes the wire 14 to the first moving frame 11 with screws, while a fixture 12a fixes a wire 15 to the second moving frame 12 with screws. The wire 14 extends between a driven roller 16, a driving roller 17 and a driven roller 18, while the wire 15 extends between a driven roller 19, a driving roller 20 and a driven roller 21. The driving roller 17 is actuated by a rotary force of a stepping motor 24 transmitted through gears 22 and 23. The driving roller 20 is actuated by a rotary force of a stepping motor 27 transmitted through gears 25 and 26. Specifically, the forward rotation of the stepping motor 24 causes the first moving frame 11 to shift in a direction of an arrow A (original scanning direction), but the reverse rotation causes it to shift in a direction of an arrow B.

Magnet pieces 28, 29 are fixed to the first and second moving frames 11 and 12, respectively, and a reed switch 30 turns on or off when the magnet pieces 28, 29 fixed in the device body 1 approach it, so as to detect a position of each of the first and second moving frames 11, 12.

Figure 4:
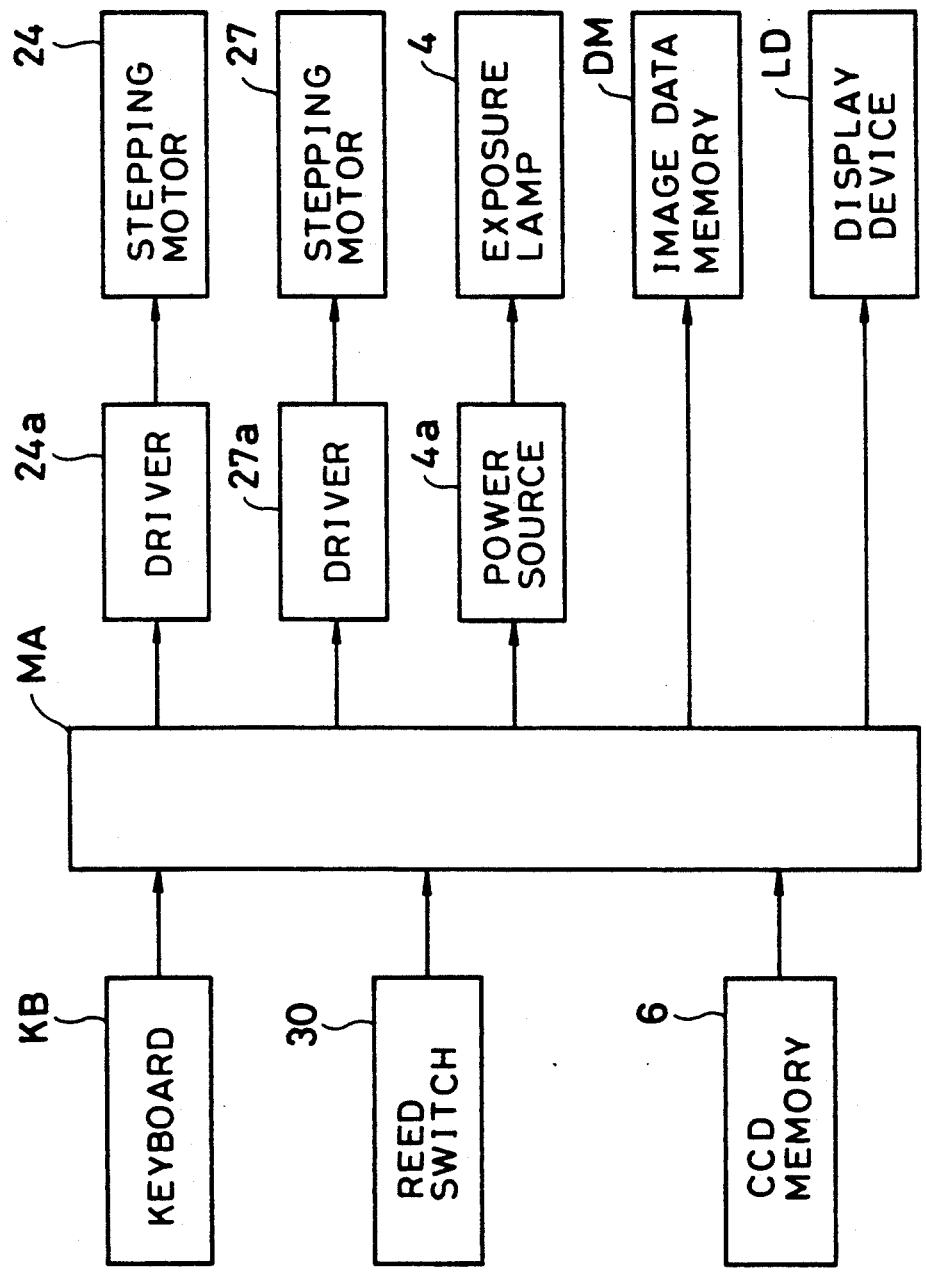
FIG. 4 is a block diagram of a control unit of the embodiment in FIG. 2.

FIG. 4 is a block diagram showing a control unit of the image reading device in FIG. 1. A microcomputer MA is composed of a CPU, a ROM, a RAM and an I/O port. A keyboard KB is used for applying a command to shift the first and second moving frames 11, 12, a command to store data and a command to start reading an image, and for setting conditions of the image reading. An image data memory DM stores image data stored in the CCD memory 6. A driver 24a applies a drive pulse to the stepping motor 24, and a driver 27a applies a drive pulse to the stepping motor 27. A power source 4a is provided for supplying the exposure lamp 4, and a display device LD displays a displacement of each of the first and second moving frames 11, 12, the conditions of the image reading, etc. The microcomputer MA receives information from the keyboard KB, the reed switch 30 and the CCD memory 6 and based on the information outputs to the driver 24a, the driver 27a, the power source 4a, the display device LD and the image data memory DM.

The image reading operation of the device will now be described. When the original sheet is set on the contact glass and the command to start reading is inputted at the keyboard KB, the exposure lamp 4 is turned on and the stepping motors 24, 27 start shifting the first and second moving frames 11, 12 from their respective home positions (shown by dash-two-dot lines in FIG. 2) in the A-direction (approach run). From the very point when the magnet piece 28 forces the reed switch to turn on, or when scanning is started, light emanated from the exposure lamp 4 is directed to the face of the original sheet, reflected thereon and further directed to the first mirror 7, the second mirror 8, the third mirror 9 and the lens 10 to be incident on the CCD memory 6. The first moving frame 11 shifts at speed V while the second moving frame 12 shifts at speed $\frac{1}{2}$V so that a predetermined optical length is kept from the upper surface of the contact glass 2 to the lens 10, whereby the light from the face of the original sheet is refracted by the lens 10 to make an image just on the CCD memory 6.

Thus, after the original sheet is scanned by a distance corresponding to the size of the original sheet which has been inputted in advance with the keyboard KB and the entire image throughout the original sheet is stored in the CCD memory 6, the exposure lamp 4 is turned off, and the first and second moving frames 11, 12 shift back to their respective home positions. Image data in the CCD memory 6 is stored in the image data memory DM, and is outputted by an external output device (e.g., a laser printer), as needed. The microcomputer MA counts the drive pulses outputted to the stepping motors 24, 27 to detect a distance of displacement and a current position of the first and second moving frames 11, 12, and stores the position, as required. The home positions of the first and second moving frames 11, 12, when they shift in the B-direction, are set as the distance of displacement (the number of the pulses) after the magnet pieces 28, 29 force the reed switch 30 to turn on.

The focusing operation will now be explained with reference to flow charts shown in FIGS. 5 and 6.

(1) Focusing with a Television

Figure 5:
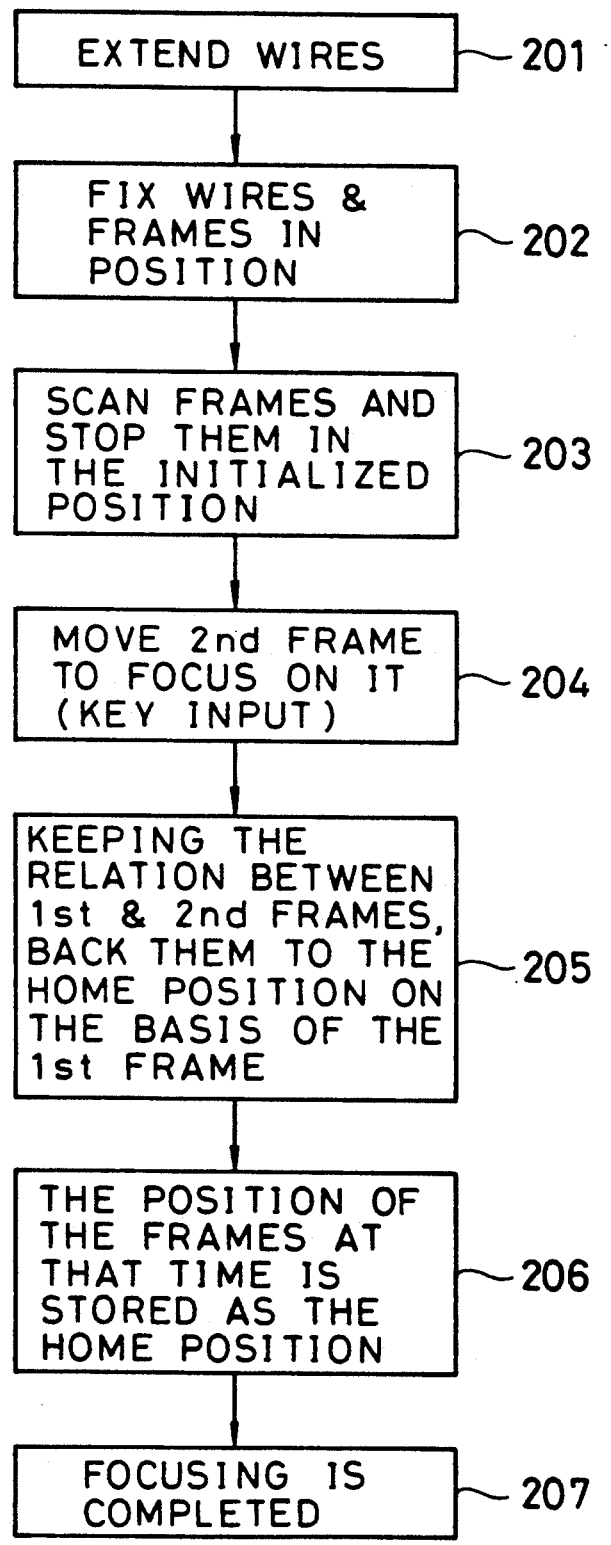
FIGS. 5 and 6 are flow charts for explaining a focusing operation of the embodiment in FIG 2.

In this case, as shown in FIG. 5, first the wire 14 extends among the driven roller 16, the driving roller 17 and the driven roller 18 while the wire 15 extends among the driven roller 19, the driving roller 20 and the driven roller 21 (Step 201). Both wires 14, 15 are fixed to the first and second moving frames 11, 12 at appropriate positions (positions closer to the arrow B from the reed switch 30) (Step 202). Then, as a key on the keyboard KB is depressed to advance the first moving frame, the microcomputer MA outputs a pulse to the driver 24a, and the driver 24a converts it into a drive pulse to rotate the stepping motor 24 in the forward direction. This causes the first moving frame 11 to shift in the A-direction and the reed switch 30 is turned on by the magnet piece 28, so that a distance of displacement from the original position is displayed (in the number of pulses applied to the stepping motor 24) on the display device LD. When the displayed distance reaches a predetermined value, the key is released to stop the first moving frame 11. In a similar way, when a key on the keyboard KB is depressed to advance the second moving frame 12, the second moving frame 12 shifts in the A-direction, and as the reed switch 30 is turned on by the magnet piece 29, a distance of displacement from the original position is displayed. As the displayed distance reaches a predetermined value, the key is released to stop the second moving frame (Step 203). This operation brings the mechanism in focus. Then, to perform a focus adjusting test an original sheet for is set on the contact glass 2, and the exposure lamp 4 is turned on. An image of the original sheet is received by a television camera which is set in the position of the CCD memory 6 in advance, and the received image is used to confirm how it is focused. When the image is out of focus, the second moving frame is shifted by depressing the key to bring the image in focus (Step 204). When a command key on the keyboard KB is depressed to shift back to the home positions, the first and second moving frames 11, 12 advance in the B-direction at speeds V and ½V, respectively. When the second moving frame 12 causes the magnet piece 29 to turn on the reed switch 30 and advances by a distance corresponding to the number of pulses set for the home positions in advance, the microcomputer MA simultaneously stops the first and second moving frames 11, 12 (Step 205). At this time, by depressing keys on the keyboard KB, the position where the first moving frame 11 is stopped is stored as its home position (Step 206). In this way, the focusing operation is completed (Step 207).

(2) Focusing with an Output Image (Copy Image)

Figure 6:
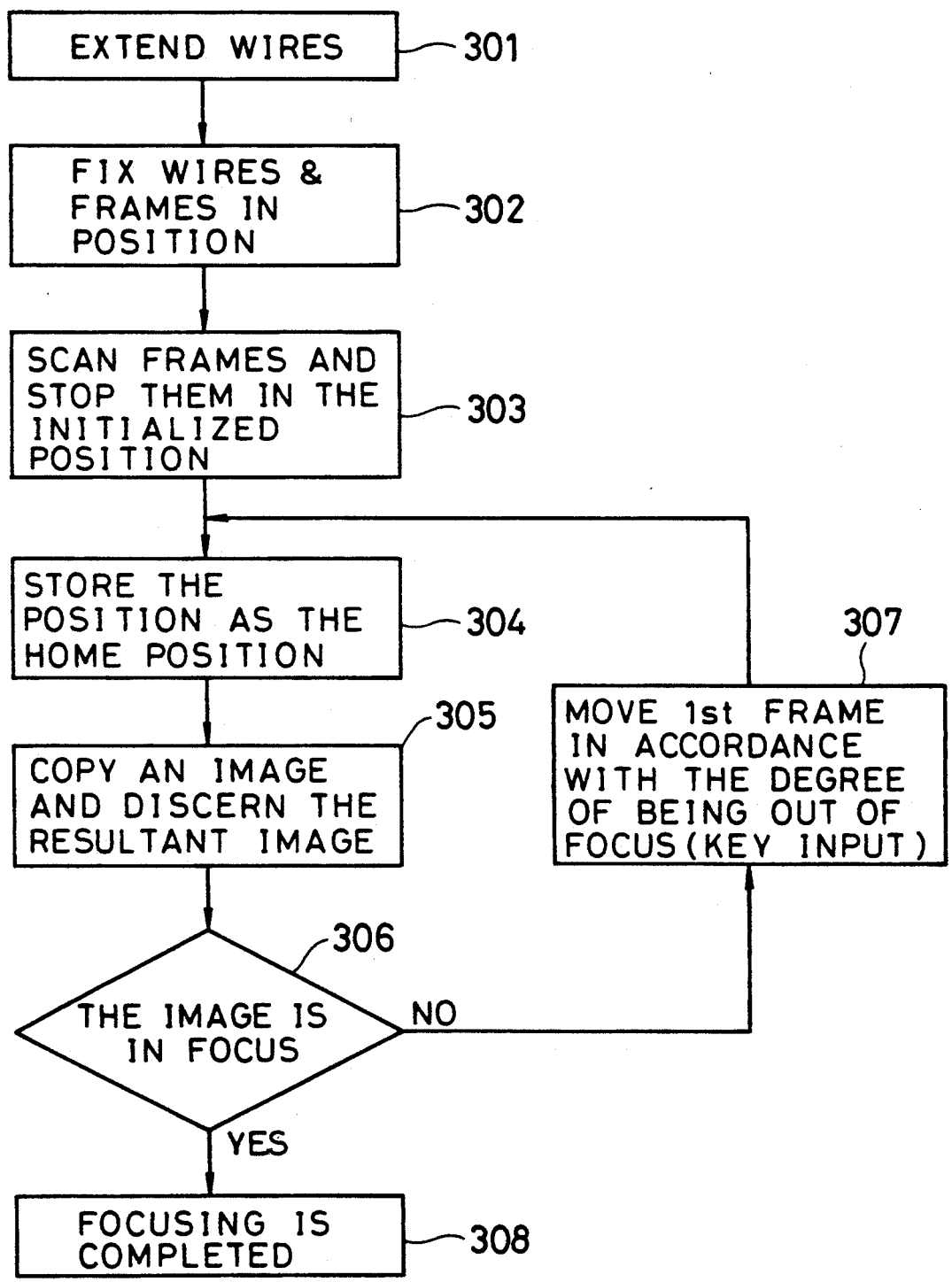

In this case, as shown in FIG. 6, the wires 14, 15 extend similar to the above case (Step 301), and they are fixed to the first and second moving frames 11, 12 in positions close to the arrow A from the reed switch 30, respectively (Step 302). Then, by depressing the keys on the keyboard KB, the first and second moving frames 11, 12 are shifted rearwards in the B-direction. After the first and second moving frames 11, 12 cause the reed switch 30 to turn on, they are advanced by predetermined numbers of pulses, respectively, and then stopped (Step 303). By depressing the keys, the positions are stored as their home positions (Step 304). Then, for focus adjustment an original sheet is set on the contact glass 2, and the key is depressed to start image reading. The original sheet is exposed to light emanated form the exposure lamp 4, an image of the original sheet is stored in the CCD memory 6, and image data therein is stored in the image data memory DM. The stored image data is outputted on a recording paper by an appropriate external output device (e.g., a laser printer), and the image made on the recording paper and the original image are compared to confirm if the resultant image is in focus (Steps 305, 306). When the image is out of focus the keys are depressed in accordance with the degree in which it is out of focus, to shift the first moving frame 11 to its home position (Step 307). The home position is reset and then stored (Step 304).

Furthermore, Steps 304 to 307 are repeated to bring the image into focus, and the focusing operation is completed (Step 308).

Thus, incorporating two stepping motors to shift the first and second moving frames individually makes it possible to adjust the focus only by an actuating operation of the stepping motors, and the focusing procedure is very simplified. Once the focusing operation is completed, the microcomputer stores the positional relations between the first and second moving frames, and hence there is no need to bring the mechanism into focus again even when the first and second moving frames are removed from the wires for mending the device.

According to an aspect of this embodiment, an optical system can be easily and rapidly brought into focus.

Now, another embodiment of the present invention will be described. This embodiment is a partially modified variation of the previous embodiment.

In a prior art image reading device, first and second moving frames are actuated by a single motor, and the first moving frame is shifted at a speed twice as fast as the second moving frame in exposure-scanning an original sheet, so as to keep an optical length from a contact glass to a lens, unchanged.

Figure 10:
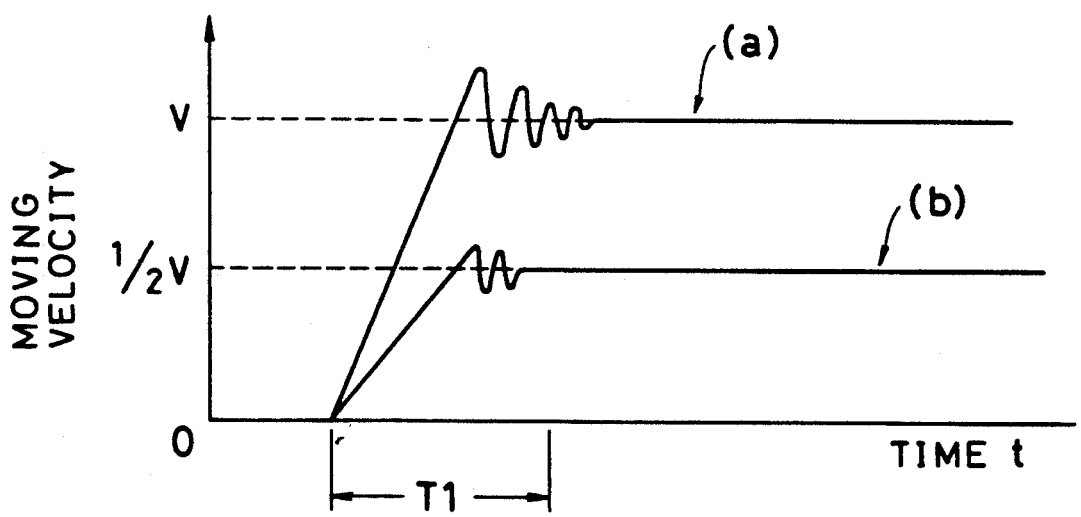
FIG. 10 is a diagram showing a prior art embodiment corresponding to FIG. 9.

FIG. 10 is a graph showing a variations in time of the velocities of the first and second moving frames in a prior art device. The first, faster moving frame, as shown in FIG. 10(a), vibrates significantly as it moves, and the time required for the moving velocity of the first moving frame to stabilize is generally longer than the time required for the moving velocity of the second moving frame to stabilize (FIG. 10(b)). Thus, the effective rising time of the first moving frame may be longer than a predetermined time T1 for an approach run depending on the circumstances, and troubles may arise in exposure-scanning. However, when the first and second moving frames are actuated by a single motor as in the prior art device, both of them are started simultaneously. Hence, if the time for an approach run, or the distance needed for an approach run, of the first moving frame becomes longer, that of the second moving frame must accordingly be set longer. This causes a disadvantage in that the device itself must be larger in size.

According to an aspect of the second embodiment of the present invention, the first and second moving frames are shifted by individual motors, respectively, and hence, it is possible to ensure a sufficiently long time for an approach run of the first moving frame, without making the image reading device itself larger in size.

Figure 7:
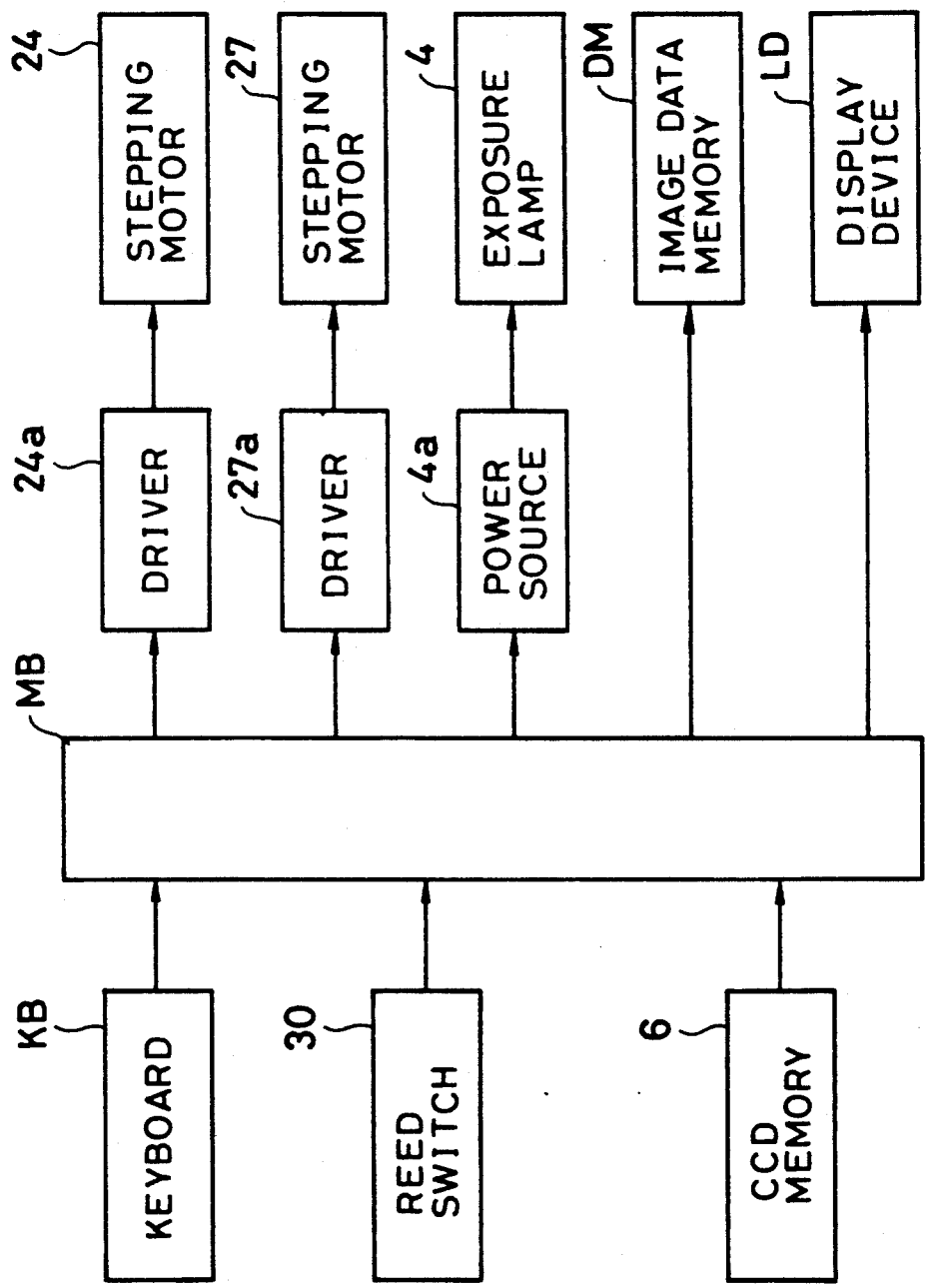
FIG. 7 is a block diagram showing a control unit of another embodiment according to the present invention.

FIG. 7 is a block diagram showing a control unit of the image reading device of the second embodiment. Reference symbols MB denotes a microcomputer composed of a CPU, a ROM, a RAM and an I/O port. Since other components are the same as those in the previous embodiment, the description hereinafter is presented in conjunction with FIGS. 2 and 3. In this embodiment, an explanation of operations common with those in the first embodiment is omitted, and like reference numerals denote components in FIG. 7 corresponding to those in the first embodiment. The operation of the device will now be described.

In setting the home positions of the first and second moving frames 11, 12, the microcomputer MB maintains an optical length, from the contact glass 2 to the lens 10, at a predetermined value and shifts the first and second moving frames 11, 12 from a position where scanning is possible in the B-direction, as in the previous embodiment. After the magnet piece 28 forces the reed switch 29 to turn on, the first and second moving frames 11, 12 are further shifted by predetermined numbers of pulses, and then stopped as shown by a solid line in FIG. 8 (the positions where the first and second frames 11, 12 are stopped now are the home positions in the previous embodiment, and when they are in these positions, the optical length from the contact glass 2 to the lens 10 are kept at the predetermined value).

Figure 8:
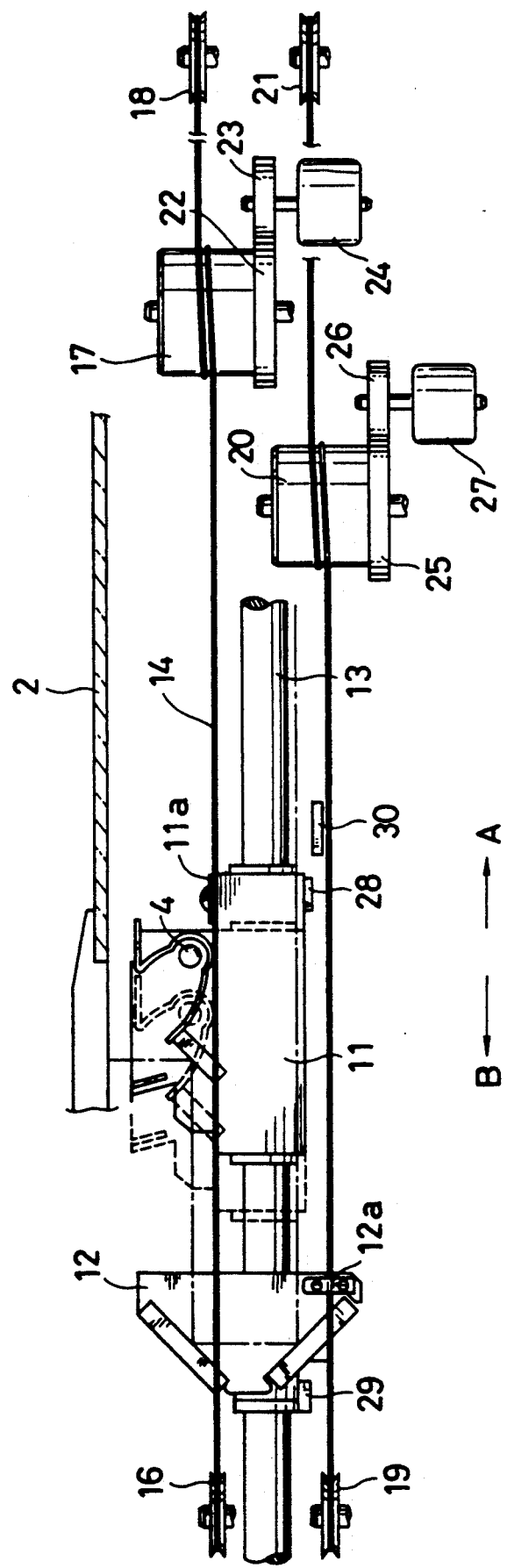
FIG. 8 is a diagram for explaining the operation of a major portion of the embodiment.
Figure 9:
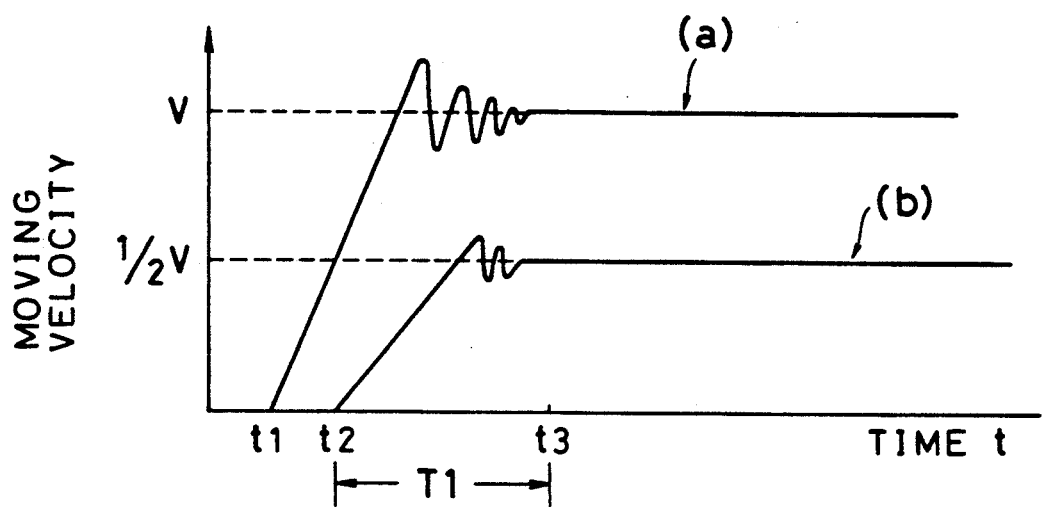
FIG. 9 is a graph showing a variation in moving velocity of first and second moving frames in the embodiment with time.

Then, the first moving frame 11 alone is further shifted by a predetermined number of pulses in the B-direction and then stopped in a position shown by a broken line in FIG. 8. By depressing keys on the keyboard KB, the microcomputer MB stores the position of a new home position of the first moving frame 11. The first and second moving frames 11, 12, are cooperatively set so that just when the first moving frame 11 is shifted from the position of the broken line to the position of the solid line in FIG. 8, the second moving frame 12 is started. By setting the home positions and actuation conditions of the first and second moving frames 11, 12 in the way, a variation in the rising velocities of the first and second moving frames 11, 12 with time is found as shown in FIG. 9.

Specifically, when a command is given to start image reading by depressing the keys on the keyboard KB, first at time t1 the first moving frame 11 is started, and then at time t2 the second moving frame 12 is started. At time t3, the scanning of the original sheet is started simultaneously with turning-on of the reed switch 30 by the magnet piece 28. However, since the first moving frame 11 has been actuated earlier than the second moving frame 12, the velocity of the first moving frame 11 can rise to a fully stable condition by the time t3.

As has been stated, the home position of the first moving frame 11 alone is changed, but that of the second moving frame 12 is not, and hence there is no need to make the device itself larger in size.

According to an aspect of the second embodiment, the fist and second moving frames are actuated by the individual motors, and it is possible to start the first moving frame earlier than the second moving frame, sot hat enough time for approach run of the first moving frame can be ensured. Thus, the scanning can be carried out at a stable speed.

Still another embodiment of the present invention will now be explained. The third embodiment is a partly modified variation of the first embodiment.

Conventionally, in an image reading device of this type, an optical length is set so that an image on the face of an original sheet which is placed on a contact glass is created on a photosensitive element, and therefore, when the original sheet is lifted off the contact glass, the optical length gets longer. Consequently, an image is unsatisfactorily created on the photosensitive element, and there arises a disadvantage in that the resultant image becomes unclear.

According to an aspect of the third embodiment of the present invention, even when the original sheet lifts off the contact glass, the image of the original sheet is satisfactorily created on the photosensitive element, so that a clear image can always be obtained.

Figure 11:
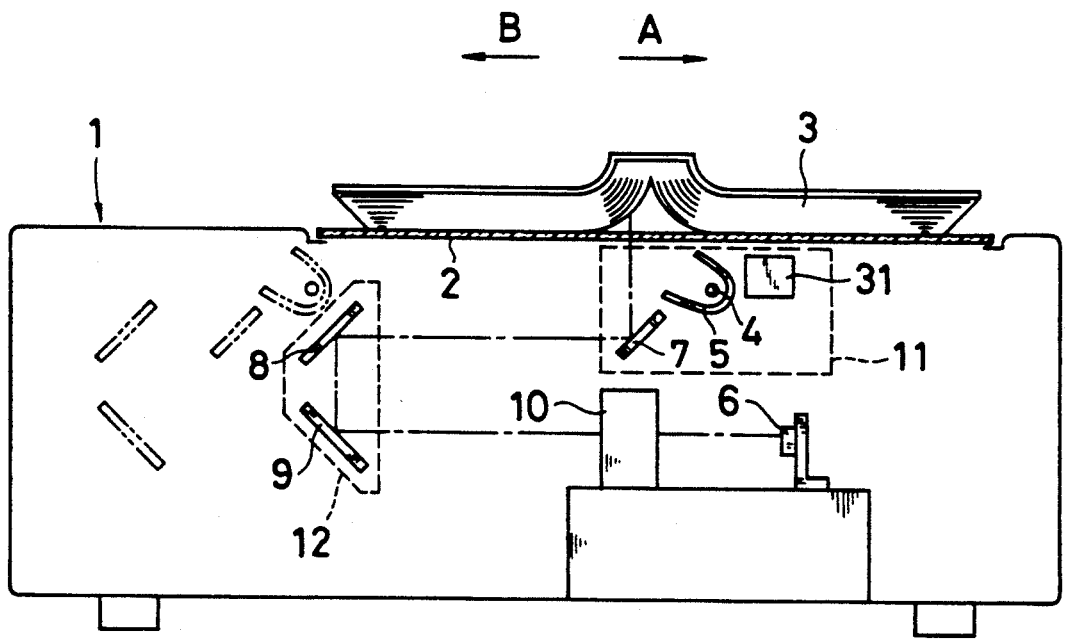
FIG. 11 is a diagram showing still another embodiment corresponding to FIG. 2.
Figure 12:
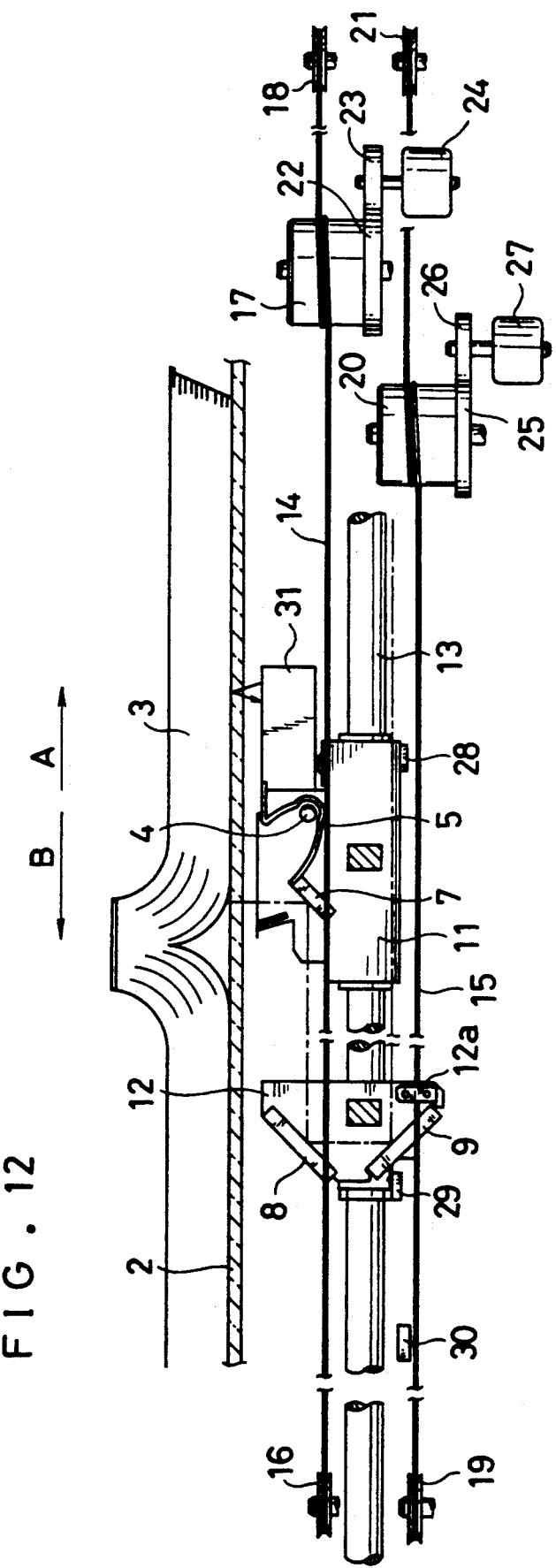
FIG. 12 is a diagram showing a major portion of FIG. 11 in detail.
Figure 14:
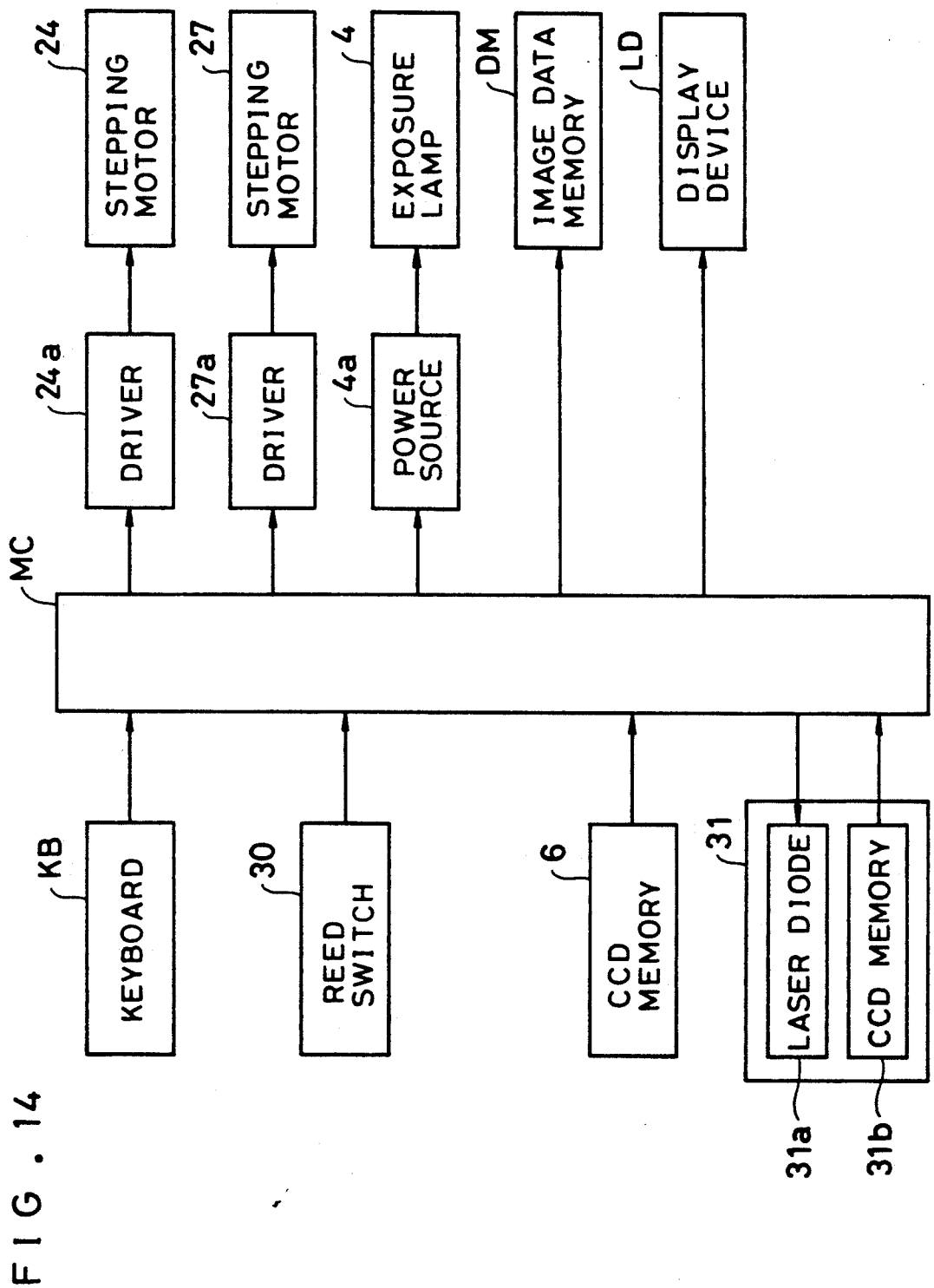
FIG. 14 is a block diagram showing a control unit of the embodiment in FIG. 11.

FIG. 11 is a schematic diagram showing an image reading device employed in a digital copying machine, and FIG. 12 is a diagram showing its main portion in detail. FIG. 14 is a block diagram showing a control unit of the device shown in FIG. 11. Referring to these figures, a measuring device 31 is provided for measuring a distance from the face of an exposed and scanned original sheet which is mounted on the first moving frame 11.

Figure 13:
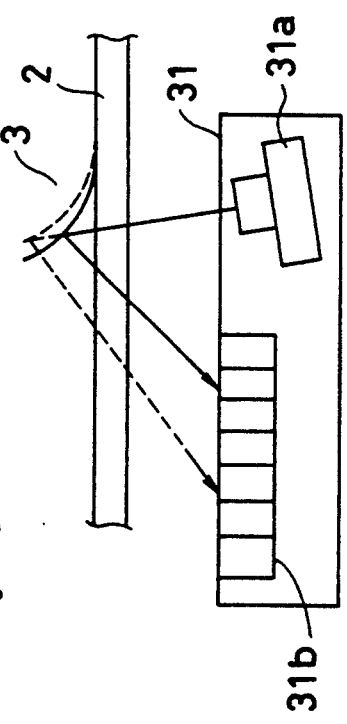
FIG. 13 is a diagram for explaining a structure of a major portion in FIG. 12.

FIG. 13 is a diagram for explaining a structure of the measuring device 31. The measuring device 31 includes a laser diode 31a which directs a beam to the surface of an original sheet through a contact glass 2, and a CCD memory 31b receives the light reflected by the surface of the original sheet. When the laser light emanated from the laser diode 31a is reflected on the surface of the original sheet and received by the CCD memory 31b, a distance between the contact glass 2 and the original sheet 3 is measured based upon a light receiving position.

FIG. 14 is a block diagram showing a control unit of the image reading device shown in FIG. 11, and reference symbol MC is a microcomputer composed of a CPU, a RAM and an I/O port. The microcomputer MC receives output from the keyboard KB, the CCD memory 31 and the CCD memory 6 to actuate the stepping motors 24, 27, the exposure lamp 4 and the laser diode 31a and outputs to the image data memory DM.

Other components are the same as those in the first embodiment, and the explanation about them is omitted. In the drawings, like reference numerals denote components corresponding to those in the first embodiment.

Figure 15:
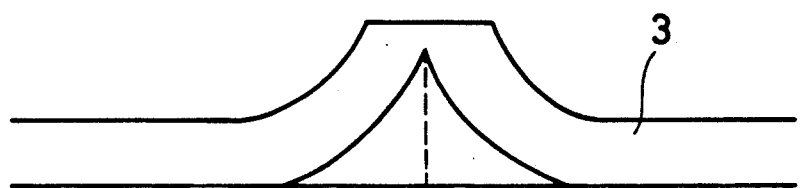
FIG. 15 is a diagram showing an original set in position in the embodiment of FIG. 11.
Figure 16:
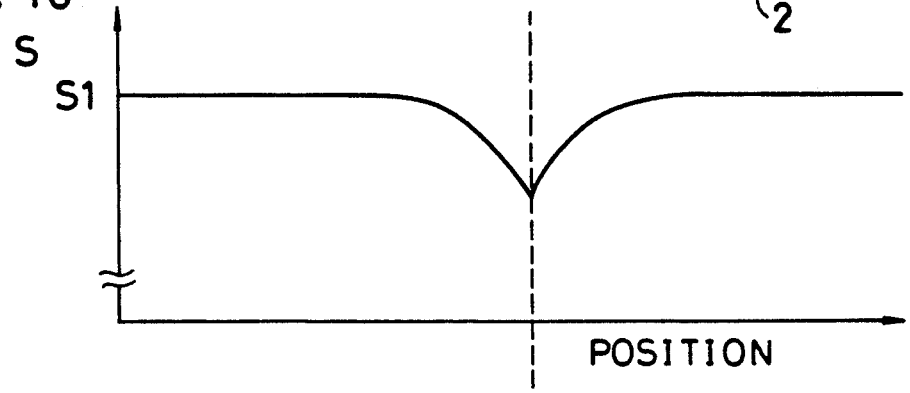
FIG. 16 is a graph showing a value of optical length varying in accordance with positional relations shown in FIG. 15.
Figure 17:
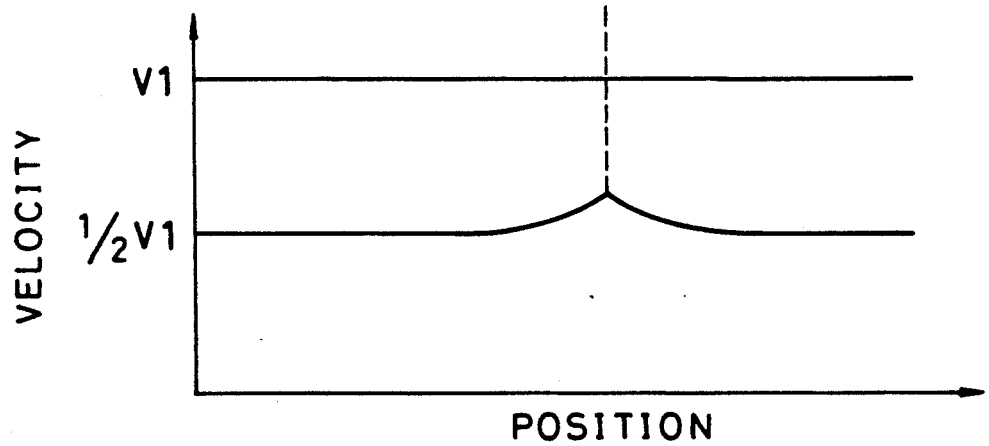
FIG. 17 is a graph showing velocities of first and second moving frames varying in accordance with the relations of position shown in FIG. 15.

The operation of the device will now be described. As shown in FIG. 15, an original (sheets bound like a book) is set on the contact glass 2. When a command to start reading is inputted with the keyboard KB, the exposure lamp 4 is turned on, the stepping motors 24, 27 are started, and the first and second moving frames 11, 12 start shifting from their respective home positions (positions shown by dash-two-dot lines in FIG. 11) in the A-direction. Accordingly, the light emanated from the exposure lamp 4 is directed to the original face. The light reflected thereon is further directed to the first mirror 7, the second mirror 8, the third mirror 9 and the lens 10 and is caused to be incident onto the CCD memory 6. An optical length S, from the upper surface of the contact glass 2 to the lens 10, is set to S1 as shown in FIG. 16, so that the image light from the original surface creates an image just on the CCD memory 6 through the lens 10. To keep the optical length S1, the first moving frame 11 starts shifting at a speed V1 while the second moving frame 12 starts shifting at a speed ($\frac{1}{2}$)V1 in the A-direction. The measuring device 31, when it reaches a binded portion of the original, detects a greater distance between the surface of the contact glass 2 and the original, due to lifting off of the original from contact glass 2. The microcomputer MC increases the velocity of the stepping motor 27, or the moving velocity of the second moving frame 12, by an amount of velocity corresponding to the detected distance, as shown in FIG. 17. As a result the optical length S (optical length from the upper surface of the contact glass 2 to the lens 10) decreases by the distance between the contact glass 2 and the original lifting off it, as shown in FIG. 16. Thus, the optical length S from the actual surface of the original to the lens 10 is maintained at S1, and the image of the original is always created in the CCD memory 6 with high accuracy. As has been stated, even if the surface of the original lifts off the contact glass, the image of the original can be clearly created.

In the above-mentioned embodiment, although the velocity of the second moving frame 12 alone is controlled corresponding to the distance between the contact glass 2 and the lifting original, the first and second moving frames 11, 12 may decrease in velocity as the distance between the original face and the contact glass becomes larger so as to compensate for a distortion of the image caused by the lifting-off of the original.

According to an aspect of the third embodiment of the present invention, even when the original lifts off the contact glass, its image can be clearly stored.

Additionally, in the first to third embodiments, cases in which an image of an original is converted into digital data by a CCD memory have been described, but the image of the original may be converted into so-called analog data by a photoconductor, for example.

What is claimed is:

1. An image reading device comprising:
   a contact glass on which an original sheet is set;
   an exposure lamp for irradiating and scanning a face of said original sheet;
   a photosensitive element provided below said contact glass;
   a first mirror for reflecting the light of said exposure lamp reflected by said original sheet toward a direction parallel to an original scanning direction;
   a second mirror for reflecting the light reflected from said first mirror;
   a third mirror for reflecting the light reflected from said second mirror toward a direction opposite to the direction of the light reflected from said first mirror;
   a lens for imaging the light from said third mirror onto said photosensitive element;
   a first moving frame for supporting said exposure lamp and said first mirror, being movable along a path of movement parallel to the original scanning direction;
   a second moving frame for supporting said second and third mirrors, being movable along a path which follows the path of movement of said first moving frame;
   first and second motors for independently moving said first and second moving frames, respectively;
   control means for actuating said first motor to move said first moving frame and thereby cause said exposure lamp to scan said original sheet and for controlling a driving velocity of said second motor to keep the optical length, between the irradiated face of said original sheet and said lens, unchanged.

2. The image reading device according to claim 1, wherein said first and second motors are stepping motors, said image reading device further comprising first and second drive means for applying drive pulses to said fist and second motors, respectively, operating means for counting the drive pulses applied to said first and second motors, so as to compute a position of each of said first and second moving frames, setting means for actuating said first or second stepping motor to set an optical length, from said contact glass to said lens, to a desired length, and storing mean for storing the set optical length; said control means controlling said first and second drive means to move said first and second moving frames and maintain the set optical length.

3. The image reading device according to claim 1, further comprising measuring means for measuring a distance between the irradiated face of said original sheet controlling a driving velocity of said second motor in accordance with the measured distance, so as to keep the optical length, between the irradiated face of said original and said lens, unchanged.

4. The image reading device according to claim 1, wherein said control means starts said first motor earlier than said second motor, before the scanning, and controls said first and second motors to maintain the optical length, between said contact glass and said lens, at a predetermined distance during the scanning.

5. The reading device according to claim 1, wherein said control means starts said first motor at a different time than starting said second motor.

6. The reading device according to claim 5, wherein said control means starts said first motor before starting said second motor.

7. The reading device according to claim 1, comprising a manual switch mechanism for controlling said first and second motors.

8. The reading device according to claim 7, wherein said manual switch mechanism comprises means for separately turning on and off said first and second motors, to thereby separately control movement of said first and second moving frames, respectively.

9. An image reading device comprising:
   a contact glass on which an object is set;
   a light source for irradiating and scanning a surface of said object;
   a photosensitive element provided on a side of said contact glass opposite to the side on which said object is set;
   first reflecting means for reflecting the light of said light source, which is reflected from said surface of said object, toward a first direction;
   second reflecting means for reflecting the light reflected from said first reflecting means toward a second direction;
   means for directing the light reflected from said second reflecting means onto said photosensitive element, said directing means comprising a lens for imaging the light from said second reflecting means onto said photosensitive element;

a first moving member for supporting said light source and said first reflecting means, said first moving member being movable along a path of movement parallel to an original scanning direction;

a second moving member for supporting said second reflecting means, said second moving member being movable along a path which follows the path of movement of said first moving member;

first and second driving means for independently moving said first and second moving members, respectively; and control means for actuating said first driving means to move said first moving member and thereby cause said light source to scan said surface of said object, and for controlling movement of said second driving means to control the focus of an image from said surface of said object onto said photosensitive element.

10. The reading device according to claim 9, wherein said control means starts said first motor at a different time than starting said second motor.

11. The reading device according to claim 10, wherein said control means starts said first motor before starting said second motor.

12. The reading device according to claim 9, comprising a manual switch mechanism for controlling said first and second motors.

13. The reading device according to claim 12, wherein said manual switch mechanism comprises means for separately turning on and off said first and second motors, to thereby separately control movement of said first and second moving members, respectively.

14. The image reading device according to claim 9, further comprising measuring means for measuring a distance between said surface of said object and said contact glass, said control means actuating said first driving means to thereby move said first moving member and scan said original sheet, and controlling a moving velocity of said second driving means in accordance with the measured distance, so as to keep the optical length, between said surface of said object and said lens, unchanged.

15. The image reading device according to claim 9, wherein said first and second driving means comprise first and second motors, respectively.

16. The image reading device according to claim 15, wherein said first and second motors are stepping motors, said image reading device further comprising first and second drive means for applying drive pulses to said first and second motors, respectively, operating means for counting the drive pulses applied to said first and second motors, so as to compute a position of each of said first and second moving members, setting means for actuating said first or second stepping motors to set an optical length, between said contact glass and said lens, to a desired length, and storing means for storing the set optical length; said control means controlling said first and second drive means to move said first and second moving frames and maintain the set optical length.

17. The image reading device according to claim 15, wherein said control means starts said first motor earlier than starting said second motor, before the scanning, and controls said first and second motors to maintain the optical length, between said contact glass and said lens, at a predetermined distance during the scanning.

* * * * *